United States Patent
Katey et al.

(10) Patent No.: US 10,616,318 B1
(45) Date of Patent: Apr. 7, 2020

(54) LOAD BALANCER EMPLOYING SLOW START, WEIGHTED ROUND ROBIN TARGET SELECTION

(71) Applicant: Amazon Technologies, Inc., Seattle, WA (US)

(72) Inventors: Anurag Sanjay Katey, Seattle, WA (US); Sridhar Srinivasan, Bothell, WA (US); Hamza Muhammad Arain, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 325 days.

(21) Appl. No.: 15/824,797

(22) Filed: Nov. 28, 2017

(51) Int. Cl.
   *H04L 29/08* (2006.01)
   *G06F 9/455* (2018.01)

(52) U.S. Cl.
   CPC ...... *H04L 67/1017* (2013.01); *H04L 67/1008* (2013.01); *G06F 9/45558* (2013.01); *G06F 2009/4557* (2013.01)

(58) Field of Classification Search
   CPC ............. G06F 9/505; G06F 2209/5022; G06F 9/5083; H04L 67/1002; H04L 47/125; H04L 67/1017; H04L 67/1008; H04L 67/1038; H04L 67/1004; H04L 67/1027; H04L 67/1029
   See application file for complete search history.

(56) References Cited

U.S. PATENT DOCUMENTS

| 2012/0204176 A1* | 8/2012 | Tian ..................... G06F 9/505 718/1 |
| 2016/0094643 A1* | 3/2016 | Jain ..................... H04L 45/44 709/226 |
| 2019/0347120 A1* | 11/2019 | Kottomtharayil ... G06F 9/45533 |

* cited by examiner

*Primary Examiner* — Hitesh Patel
(74) *Attorney, Agent, or Firm* — Blank Rome LLP (57) ABSTRACT

A system includes a load balancer and storage including a first data structure and a second data structure. Each of the data structures includes a plurality of different weight levels. At least one of the weight levels of the first data structure includes an identifier of a target. At least one of the weight levels of the second data structure includes a map that associates a target identifier with a final weight value. Responsive to receipt of a request and responsive to a target identifier included at a given weight level in the first data structure corresponding to a pointer, the load balancer selects the target identified in the first data structure at the given weight level. Responsive to no target identifiers included at the given weight level in the first data structure, the load balancer selects a target identified in the second data structure at the given weight level. The load balancer forwards the request to the selected target.

7 Claims, 5 Drawing Sheets

LOAD BALANCER EMPLOYING SLOW START, WEIGHTED ROUND ROBIN TARGET SELECTION

BACKGROUND

In network-based computing environments, multiple computers may be employed to manage incoming service requests. Load balancers may be used to distribute the service requests across the multiple computers. Distributing the service requests across the computers helps optimize resource utilization, maximize throughput, and avoid overload of any one of the computers. Typically, a load balancer receives a request from a client device, selects one of the multiple computers to service the request, and routes the request to the selected computer, which processes the request and issues a response. Load balancers generally attempt to distribute the request load evenly across all of the service computers in an effort to prevent any individual computer from being overloaded with requests.

BRIEF DESCRIPTION OF THE DRAWINGS

For a detailed description of various examples, reference will now be made to the accompanying drawings in which.

DETAILED DESCRIPTION

Considering the scale at which many service provider networks operate, load balancers within the provider network benefit should operate efficiently and quickly. For load balancers that distribute incoming request packets (also termed "requests") to back-end application instances (referred to as "targets" herein), a load balancer should permit targets to be added to a target group in a "slow start" state. A target group comprises one or more targets, and the load balancer selects one of the targets within the target group to receive an incoming request. Slow start refers to increasing the weight of a target from an initial lower weighting to a higher weighting over a period time to thereby force the load balancer to send requests at a lower rate to the target initially and send requests to the target at an increasingly higher rate over a predetermined or configurable time period. By slow starting a target (e.g., a virtual machine instance), the target can begin to slowly accumulate data in its cache before it is bombarded with a large number of requests in a short period of time. The size of the slow start period can be adjusted based on how long it takes for the caches to warm up. Further, a load balancing system should operate seamlessly in the face of users of the service provider network registering new targets to a target group. Multiple targets may form a target group and the load balancer selects one of the targets within the target group to receive an incoming request. The load balancer also should permit users to add targets to, and remove targets from, an existing target group while the load balancer is actively receiving and processing request. The load balancer should also provide support dynamic changing of target and target group attributes.

The load balancer described herein accommodates some or all of the above-described features. The load balancer can implement a weighted round robin algorithm with slow start, but also can implement weighted round robin without slow start and simple round robin (weights for the targets are all the same) with or without slow start. The user can configure the load balancer for any of these modes of operation.

In the case of weighted robin with slow start, the load balancer includes or has access to a non-slow start (NSS) multilevel list and slow start (SS) multilevel list. Each of the multilevel lists includes multiple weight levels. The NSS multilevel list includes an identifier of a target at the weight level in the list to which the user has specified for that target. For example, if the user has specified a weight level for a given target of 50, the identifier for that target will be stored at weight level 50 in the NSS multilevel list. The SS multilevel list includes identifiers of those targets that are currently in the midst of a slow start phase. A user may have specified a final weight value for a target of 100, but that the weighting of the target should be incremented during the slow start phase from an initial weighting of, for example, 1 until the weighting reaches 100, at which time the target's identifier is moved from the SS multilevel list to the NSS multilevel list at weight level 100.

Responsive to receiving an incoming request, the load balancer selects a target from one of the NSS or the SS multilevel lists according to an algorithm that is biased in favor of selecting targets at higher weight levels within the lists. An example of suitable target selection logic is disclosed herein. Because the target selection logic is able to select targets from both the NSS as well as the SS multilevel list, the target selection logic is able to select targets that are currently in a slow start phase with their current weights less than the user-specified final weight value.

The target selection logic described herein permits the load balancer to select a target within a constant time period, meaning that it takes the load balancer to same amount of time to select a target from a target group comprising 10 targets as it does to select a target from a target group comprising 1000 targets. The amount of time to select a target is not a function of the number of candidate targets within the group.

In some implementations, a "target" refers to a back-end server executing the user's application or a virtual machine instance (executing the application) that executes on a server to which the load balancer forwards requests according to a target allocation process. A target also may refer to other types of back-end processing systems such as containers, compute systems identified by a public internet protocol (IP) address (i.e., IP addresses outside the service provider network), etc.

Figure 1:
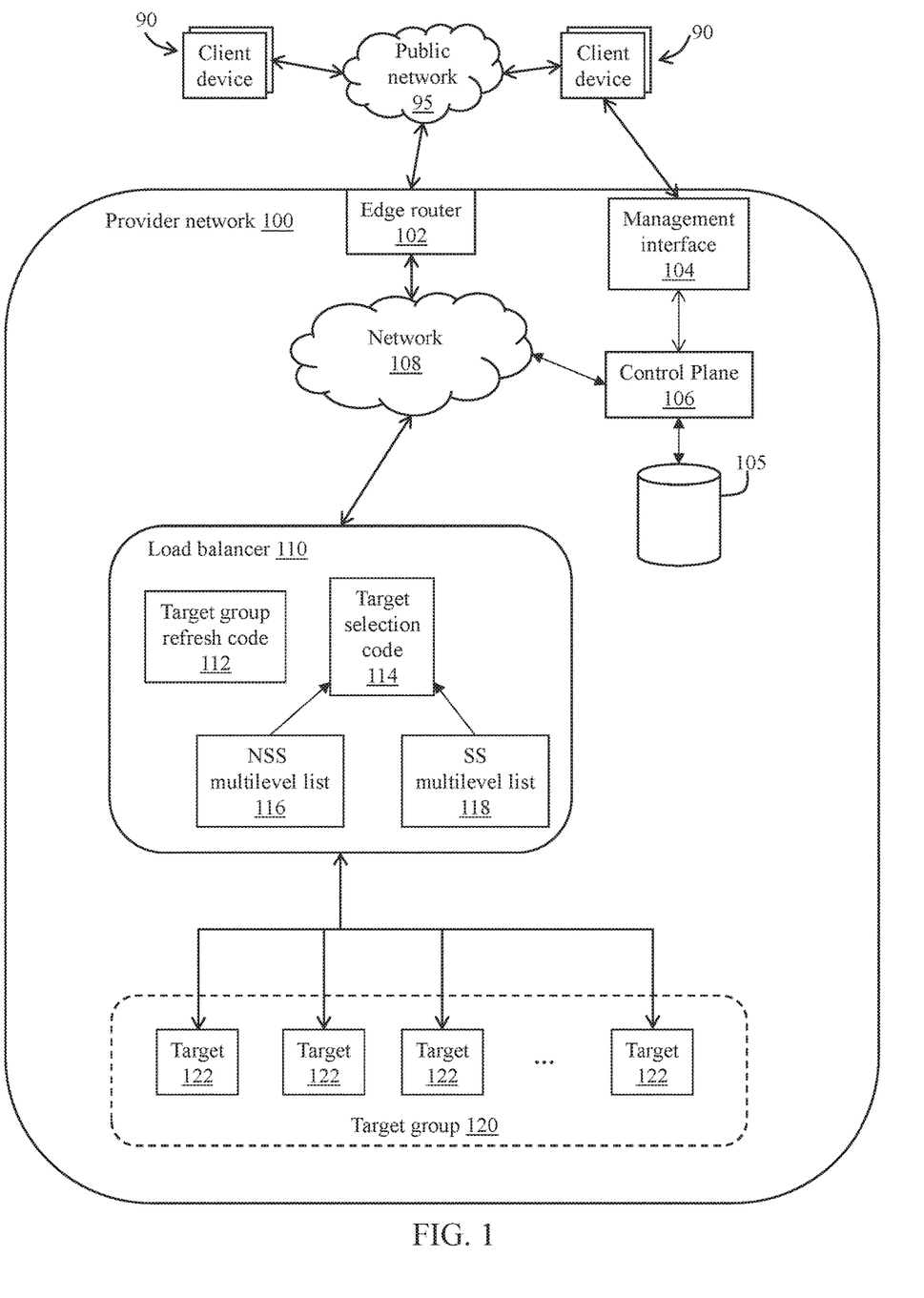
FIG. 1 shows a provider network including a load balancing service in accordance with various examples.

FIG. 1 shows of a provider network 100 to which users can access via client devices 90 over a public network. A client device 90 may comprise a personal computer, a tablet device, a smart phone, a server, or any other type of electronic device. The public network 95 may comprise one or more wired or wireless networks, wide area networks, local area networks, etc. The provider network 100 includes an edge router 102 to provide connectivity to the public network 95, an internal network 108, a management interface 104, and a control plane 106. Users of the public network 100 can interact with the management interface 104 to access services controlled and/or provided by the control plane 106. Through the management interface 104 and the control plane 106, users are able to, for example, instantiate targets 122, create a target group 120 to include one more targets 122, create a load balancer 110, configure the load balancer 110 as described herein, and attach the load balancer 110 to the user's target group 120.

Through the management interface 104, the user can create the load balancer 110 and attach it to the target group 120 specified by the user. In one example, the management interface 104 comprises a web service application programming interface (API) or a web console. As a web console, the management interface 104 may be a graphical user interface (GUI) displayed on the user's client device 90 (e.g., on a browser executing on the client device). As an API, the user can submit API requests to create targets 122, create target groups 120, create a load balancer 110, configure the load balancer 110, attach the load balancer 110 to the user's target group 120, etc. The user can add targets 122 to the target group 120 after the initial creation of the target group and even while the load balancer 110 is actively distributing requests to the target group.

The management interface 104 may respond to API requests from the user by providing such API requests to the control plane 106, The control plane 106 comprises one more services executing on servers that perform, or cause to be performed, the functionality requested by the user. The control plane 106 may comprise, or have access to, a placement service to select a host server within the provider network 100 on which to execute a virtual machine instance for the user. The placement service also may select a server on which to execute the functionality of the load balancer 110 described herein. In the example in which targets 122 and the load balancer 110 are implemented as virtual machine instances, the control plane 106 may provide, or cause to be provided, a machine image to the selected server to implement the virtual machine instance and/or balancer for the user. The control plane 106 also may provide the load balancer with configuration data such as those parameters indicated below. The API requests may be stored in a database 105 pending their execution by the control plane 106.

The management interface 104 permits the user to specify any or all of the following configuration parameters (which may be specified as arguments in one or more API requests):

Load balancing algorithm—weighted robin with slow start, weighted round robin without slow start, simple round robin with slow start, and simple round robin without slow start.

Target weight—a weight value assigned by the user to a given target. If the target is to be slow started, the user-specified target weight is the final weight value that the target should reach at the end of the slow start ramp time.

Slow start ramp time—a time period (e.g., specified in units of seconds, minutes, etc.) that is the time period that a target's weighting should increase from an initial weight level to the final weight level specified for the target by the user.

Definition of which targets 122 are to be included in a given target group 120.

Updates to any of the above parameters.

The load balancing algorithm and slow start ramp time are target group level attributes. As such, the user-specified slow start ramp time applies to all targets 122 within the target group 120, and all targets 122 within the target group 120 are selected by the load balancer according to the same load balancing algorithm. The target weight is specified separately by the user for each target. That is, the target weight can be set differently among the targets 122 within the same target group.

In the example provided herein, the weight values range from 0 to 100 in integer increments (i.e., 0, 1, 2, . . . , 99, 100). Targets at higher weight values are selected more frequently to process requests than lower-weighted targets. The maximum weight in this example is 100. A weight value of 0 for a given target means that no requests should be sent to that target. A target that has been deemed unhealthy may have its weight level set at 0 to avoid receiving further requests.

Referring still to FIG. 1, the load balancer 110 includes target group refresh code 112 and target selection code 114, which are both stored in memory and executed by a processor. The target group refresh code 112 updates weightings of the targets currently in the SS multilevel list 114 upon occurrence of a triggering event. A triggering event to update the SS multilevel list may include a change in the configuration of the target group 120, such as a target 122 being added to the group, a target being removed from the group, a change in the slow start ramp time for the group, a change in the user-specified weight value for a target within the group, etc. The target selection code 114 selects a target to receive an incoming request from among the NSS multilevel list 116 and the SS multilevel list 118. Operation of the target group refresh code 112 and target selection code 114 is described below with regard to FIGS. 4 and 5, respectively.

Figure 2:
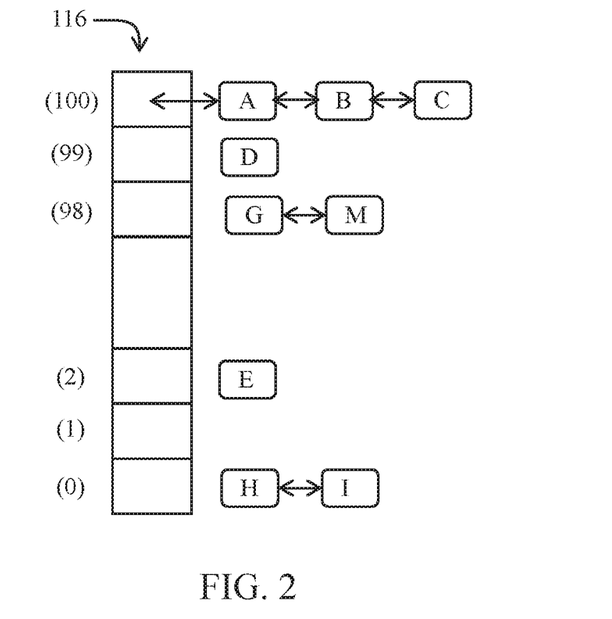
FIG. 2 illustrates a non-slow start multilevel list for use by the load balancing service in accordance with various examples.
Figure 3:
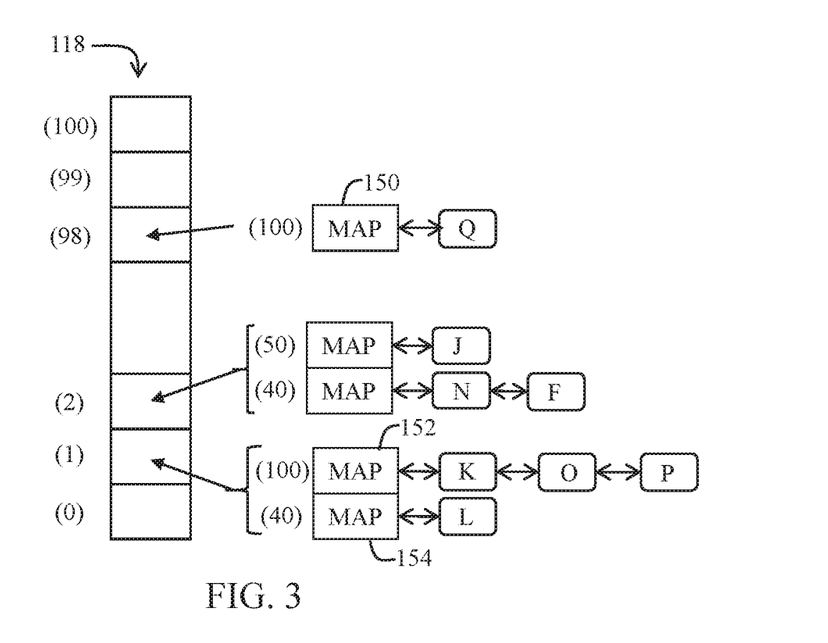
FIG. 3 illustrates a slow start multilevel list for use by the load balancing service in accordance with various examples.

FIGS. 2 and 3 illustrate a NSS multilevel list 116 and a SS multilevel list 118, respectively. Referring first to FIG. 2, the NSS multilevel list 116 includes weight levels 0 to 100. The weight levels shown in the examples of FIGS. 2 and 3 are shown in parentheses. Several targets are shown with their corresponding weight levels. A target is included in at a given weight level in the list using an identifier associated with the target. The identifier may include an alphanumeric name, an internet protocol (IP) address, or another type of values capable of uniquely identifying the targets. Targets A, B, and C are assigned to weight level 100. Target D is assigned to weight level 99, while targets G and M are assigned to weight level 98. Target E is at weight level 2 and targets H and I are weight level 0. Any number of targets can be assigned to any weight level, and not every weight level need have a target mapped to it. For example, weight level 1 is illustrated as not having any targets assigned to it. The weight levels associated with each target in the NSS multilevel list of FIG. 2 are the weight values specified by a user that are used when targets are created or added to the target group. The weight level for a given target is static in the NSS multilevel list, but a user can manually change the weight level for a given target at any time by submitting a request to an application program interface provided by the provider network 100 as described above.

FIG. 3 shows an example of the SS multilevel list as including the same weight levels as the NSS multilevel list 116 (i.e., 0 to 100). The targets in the SS phase are included in the SS multilevel list by way of a map. Each map comprises a key-value pair. The key is the final weight value assigned by the user to the target, and the value includes the identifier of each target in the map. For example, map 150 is stored at weight level 98 in the SS multilevel list 118 and has a key value of 100 for target Q. That is, target Q has a user-specified final weight value of 100, but is current at weight level 98 in the SS multilevel list. Once the target Q's map 150 reaches weight level 100 in the SS multilevel list, map 150 will be removed from the SS multilevel list and the identifier for target Q will be added to weight level 100 in the NSS multilevel list 116.

Some weight levels in the SS multilevel list 118 may not have any maps, while other weight levels have one map or even more than one map. For example, weight level 1 in the SS multilevel list 118 includes two maps 152 and 154. Map 152 includes identifiers of targets K, O, and P as its value and a final weight of 100 as its key. That is, the user has specified a weight value of 100 for targets K, O, and P, and the current weight for these three targets is 1, but the weight will increase during the slow start ramp time until the weight reaches 110 at which time targets K, O, and P will be removed from the SS multilevel list 118 and added to the NSS multilevel list 116 at weight level 100. Map 154 also is shown at weight level 1 in FIG. 3 and has a single target L with a user-specified weight of 40.

In some embodiments, the ramp time is a target group level attribute meaning that all targets to be slow started in a group will transition from their initial weight level to the final user-specified weight level in the same amount of time. The initial weight level may also be fixed for the target group. In the example of FIG. 3, the initial weight level is 1, meaning that all slow start targets are added to the SS multilevel list 118 upon registration into the target group at weight level 1. Targets K, O, and P have a final weight level of 100, while target L has a final weight level of 40, but all four targets K, O, P, and L are currently at weight level 1 in the SS multilevel list 118. Given that the ramp time for all of the targets in the SS multilevel list 118 is the same, the rate of change of the slow start weights for targets K, O, and P is greater than the rate of change for target L. Target K's slow start weight, for example, has to transition from 1 to 100 in the same amount of time that target L's slow start weight has to transition from 1 to 40. Thus, while maps 152 and 154 are currently at the same slow start weight level (level 1), at future points in time, map 152 will be assigned to a higher weight level than map 154.

Figure 4:
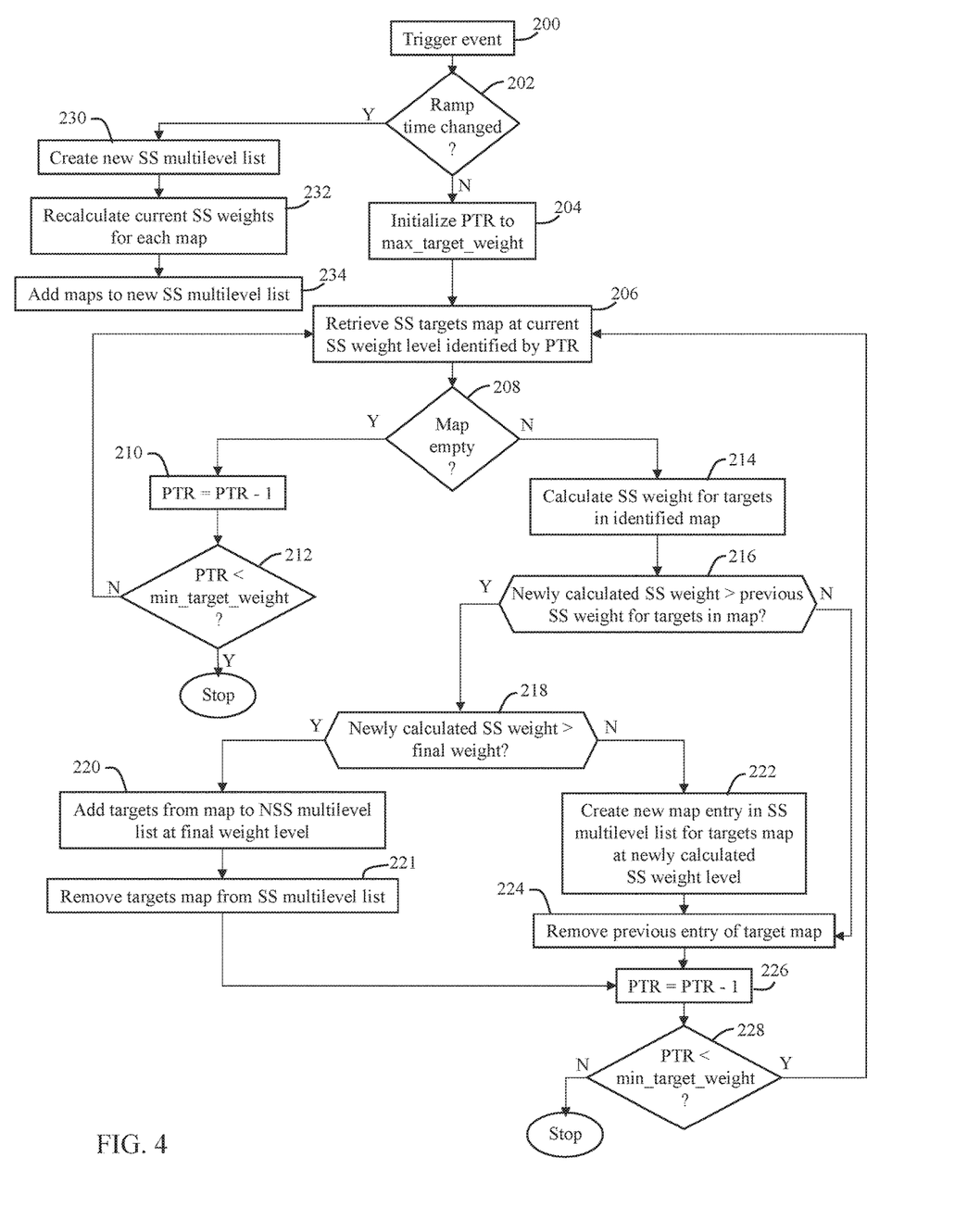
FIG. 4 shows a method for modifying the weights within the slow start multilevel list.

FIG. 4 shows an example of a method of modifying the slow start multilevel list 118, which is a process implemented through execution of the target group refresh code 112. The operations may be performed in the order shown, or in a different order. Further, two or more of the operations may be performed concurrently rather than sequentially. Even for two operations that are performed sequentially, the latter operation may begin execution before completion of the former operation.

A triggering event occurs at 200. As noted above, the triggering event may comprise a change in the configuration of the target group or a load balancer attribute. For example, a user may change the slow start ramp time, for example, from 10 minutes to 15 minutes. The user may add a target 122 to the target group, or remove a target from the target group. The user may opt to discontinue the slow start phase for a target and have the weight for the target used for target selection purposes jump to the user-specified weight level.

At 202, the method includes determining whether the slow start ramp time has changed. If the slow start ramp time has changed, then operations 230, 232, and 234 are performed (described below) to recalculate all of the slow start weights for the maps in the SS multilevel list. If the slow start ramp time has not changed, then at 204, the method includes initializing a pointer (PTR) to the largest weight level in the SS multilevel list. This maximum weight level is called the max_target_weight, and in the example of FIG. 3 the max_target_weight is 100.

At 206, the slow start targets map in the SS multilevel list 118 at the current weight level associated with PTR is retrieved. For example, for a PTR value of 100, the map at weight level is retrieved. The map may or may be empty. The map will be empty if no targets currently corresponding to that particular weight level. In the example of FIG. 3, weight level 99 for instance has no targets and thus its map is empty (although an empty map is not shown for weight level 99). If the map at the particular weight level is determined to be empty, then at 210, PTR is decremented. At 212, the method determines whether PTR is less than the minimum weight value for targets (min_target_weight). In the example in which weights can vary from 1 to 100 (with a weight of 0 meaning no requests are to be sent to the target), the min_target_weight is 1. If PTR is less than min_target_weight, then the process has analyzed all of the maps at the various weight levels in the SS multilevel list and the process ends. However, if PTR is not less than min_target_weight, then control returns to operation 206.

At 208, if the map at the weight level pointed to by PTR is not empty, then the method continues at 214 at which the slow start weight for the targets in the map are recalculated. The map is currently at a particular weight level and a new weight level is calculated according to the following example calculation:

$$\text{new SS weight} = \text{current ss weight} + (\text{current time} - \text{reg\_time})\left(\frac{\text{final weight}}{\text{ramp time}}\right)$$

where "new SS weight" is the newly calculated slow start weight, "current SS weight" is the current value of the SS weight, "current time" is the current time, "reg_time" is the registration time for the targets in the map, "final weight" is the user-specified weight for the targets in the map, and "ramp time" is the user-specified slow start ramp time. The registration time may comprise the time the user issues a command to add a target 122 to the target group, or the time that notice is given to the load balancer that a target has been added.

The weight values are integer values in the disclosed examples, and thus, given that the ramp time may be on order of minutes (e.g., 15 minutes) and that there are only a finite number of weight levels (e.g., 100), it is possible that the new SS weight for a given slow start targets map is the same as the current slow starts weight. As such, at 216, the method includes determining whether the newly calculated slow start weight is greater than the previous slow start weight for the targets of the slow start targets map. If the newly calculated slow start weight is not greater than the current slow start weight, then control drops down to operation 226. At that point, PTR is decremented and compared, at 228, to the min_target_weight value. If the newly decremented value of PTR is less than min_target_weight, then the process ends. Otherwise, control loops back to 206 to cycle again through the process but with a decremented PTR thereby permitting analysis of slow starts map at lower weight level.

However, if at 216 it is determined that the newly calculated slow start weight is greater than the previous slow start weight for the targets of the slow start targets map, then the method includes determining whether the newly calculated slow start weight is greater than the final weight value specified by the user for the targets of the map. If the newly calculated slow start weight is not yet greater than the user-specified final weight value, then control moves to operation 222 at which a new entry is created in the SS multilevel list 118 to include the slow start targets map at the newly calculated weight level. At 224, the method includes removing the previous entry from the SS multilevel list containing the targets map. That is, the targets map is moved from its previous slow start weight level to the higher newly calculated weight level. The pointer is then decremented at 226 as described above and the control loops back to 206 after a determination as to whether the min_target_weight value has been reached at 228.

If, at 218, it is determined that the newly calculated slow start weight is greater than the user-specified final weight value, then at 220 the method includes adding the targets from the slow start targets map to the NSS multilevel list 216 at a weight level that equals the user-specified final weight level for the targets. At 221, the method includes removing the slow start targets map from the SS multilevel list 218. The pointer is then decremented the process iterates as described above.

Referring back to operation 202, if the triggering event at 200 includes a change the slow start ramp time (e.g., the user reconfigures the ramp time for the target group 120), then a new SS multilevel list is created, or the existing SS multi-level list is recalculated, using the new slow start ramp time. For example, at 230 the method includes creating a new SS multilevel list, and at 232, recalculating the current SS weights for each slow start targets map of the current SS multilevel list using the new ramp time. The equation above to calculate the new SS weight is a function of the ramp time, and can be used to calculate the new SS weights. At 234, the method includes adding each recalculated map to the newly created SS multilevel list. The former SS multilevel list is deleted or otherwise not used.

The SS multilevel list update logic is performed in an amount of time that generally does not vary with the number of targets in the target group. Because the targets in the slow start phase are identified in group by the various slow start targets maps and the weight updates are computed for the maps, the update of the weights is not a function of the number of targets identified in the SS multilevel list.

Figure 5:
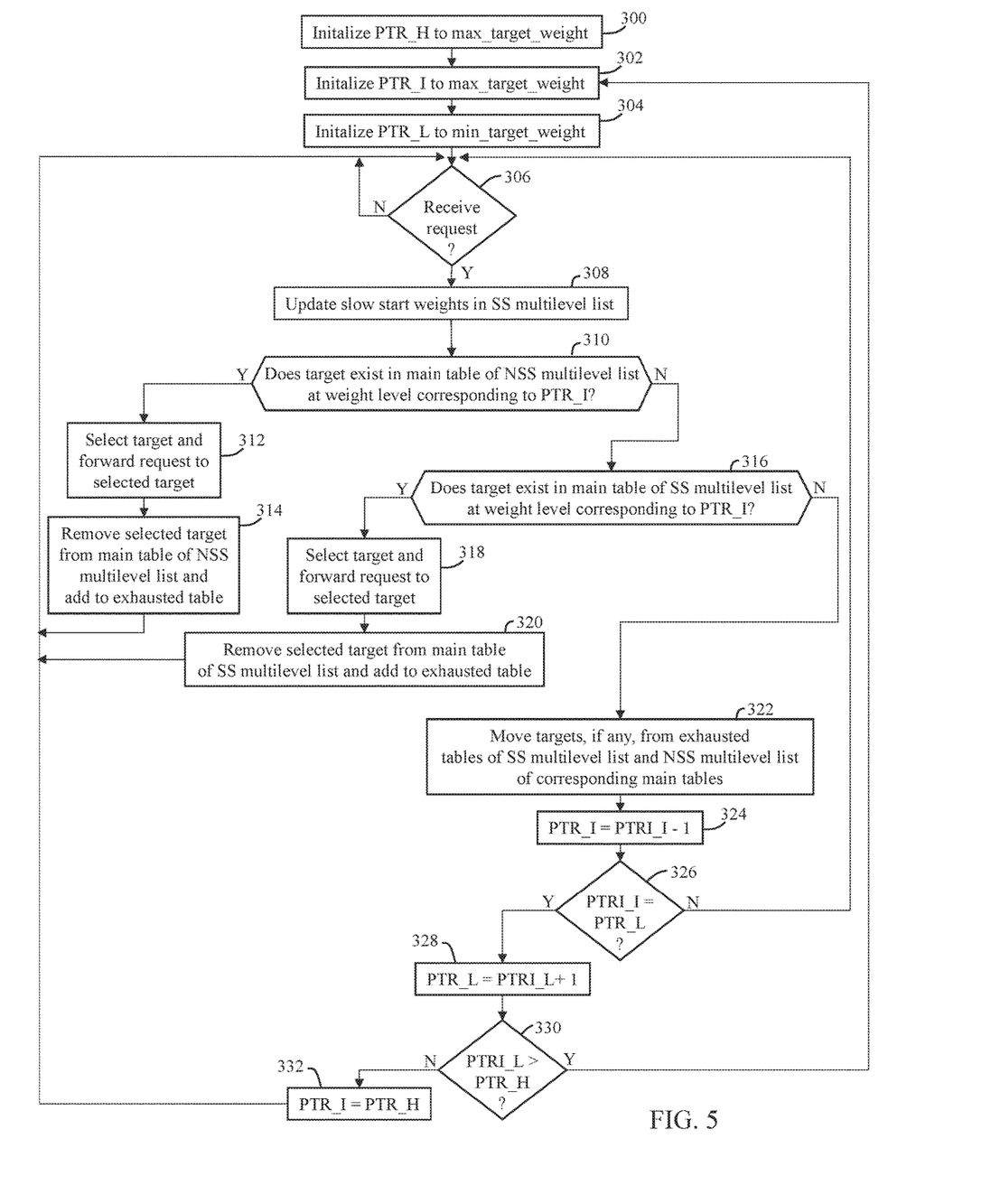
FIG. 5 illustrates target selection logic in accordance with various examples.

FIG. 5 shows an example of a method for selecting targets upon receipt by the load balancer 110 of a request to be processed by one of the targets 122. The target selection code 114 then may be invoked to perform the operations shown in the example of FIG. 5. The operations may be performed in the order shown, or in a different order. Further, two or more of the operations may be performed concurrently rather than sequentially. Even for two operations that are performed sequentially, the latter operation may begin execution before completion of the former operation.

At 300-324, the method includes initializing pointers PTR_H, PTR_I, and PTRI_L. The PTR_H and PTR_I pointers are initialized to the max_target_weight value at 300 and 302. The PTR_L pointer is initialized to the min_target_weight value at 304. Upon receipt of a request (306), the target group refresh code 112 may be invoked (308) to update the slow start weights of the slow start targets maps contained in the SS multilevel list 118. FIG. 4 shows an example of the SS multilevel list update. The update to the SS multilevel list occurs once every X seconds. In one example, X is 1 second and thus the SS multilevel list update may occur every second. If multiple requests are received within the X period of time, the SS multilevel list update of operation 308 is only performed once during that same period of time, not once for every request received during the time period. In some embodiments, X is an adjustable period of time that can be modified by the service provider to vary the performance of the load balancer.

For target selection, a main table and an exhausted table are maintained at each weight level of each of the NSS and SS multilevel lists 116 and 118 to keep track of which targets have been selected for processing requests received by the load balancer. Initially, identifiers of all of the targets at a given weight level are included in the main table of the corresponding multilevel list. Once a target is selected by the load balancer, that target's identifier is moved to the exhausted to signify to the target selection code 114 that that target has recently been selected. Thus, at 310 the method includes determining whether the main table of the NSS multilevel list at the weight level corresponding to the PTRI_I pointer contains at least one target. If a target does exist in the main table of the NSS multilevel list, that target is selected and the request is forwarded to the selected target at 312 and the target is removed from the main table and added to the corresponding exhausted table at that weight level (314). The method then loops back to 306 to await a new request.

If no target identifiers exist in the main table of the NSS muiltilevel list at the level pointed to by PTRI_I, then the method checks the SS multilevel list for a target to select. At 316, the method includes determining whether a target identifier exists in the main table of the SS multilevel list at the weight level corresponding to PTR_I. If a target does exist in the main table of the SS multilevel list, that target is selected and the request is forwarded to the selected target at 318 and the target is removed from the main table and added to the corresponding exhausted table at that weight level (320). The method then loops back to 306 to await a new request.

If, at 316 it is determined that no target exists in the main table of the SS multilevel list, then at 322 all of the target identifiers (if any) are moved from the exhausted tables to the main tables for each of the multilevel lists at the current weight level pointed to by PTRI_I. It is possible that there simply was no target in either multilevel list at the current weight level and thus no target would have been selected and there would be no target identifiers to move from the exhausted tables to the main tables.

In some embodiments, adding a target identifier to the exhausted tables includes adding the target identifier to the tail of the corresponding exhausted table. In this embodiment, the selected targets are moved to the exhausted in the order in which they were selected. Then, when the target identifiers from the exhausted tables are moved back to the corresponding main tables, they are placed back in the main tables in the same order. As such, the targets at a given weight level will generally be selected in the same order.

In another embodiment, the target identifiers are added to the exhausted tables in a random or pseudo random order to impose a random order of the selection of the targets at a given weight level. For example, a random number function can be invoked when needing to move a target identifier to an exhausted table. The random number function may output a 0 or a 1. A 0 may cause the target identifier to be added the head of the exhausted table and a 1 may cause the target identifier to be added the tail of the exhausted table, or vice versa.

At 324, the method includes decrementing the PTRI_I pointer to force it to point to the next lower weight level. The process then repeats if it is determined at 326 that PTR_I has not yet reached PTR_L. If, however, PTR_I equals PTR_L then at 328 PTR_L is incremented. Incrementing PTR_L once PTR_I equals PTR_L precludes the lowest weight level in the multilevel lists pointed to by PTR_L from being candidates for selection during the subsequent loop through the selection logic. After incrementing PTR_L at 328, the method determines whether PTR_L exceeds PTR_H, which if true would mean that all of the targets in the both of the multilevel lists have been selected in accordance with their corresponding weight values. If PTR_L exceeds PTR_H, then control continues at 302 at which point the PTR_I and PTR_L pointers are reset, and the entire process repeats. If PTR_L does not exceed PTR_H (332), then only the PTR_I is reset (to equal PTR_H) and the process flow continues at 306.

The target selection logic selects a target in an amount of time that generally does not vary with the number of targets in the target group. Because, upon receipt of a request, the pointer PTRI_I is already pointing at the weight level in the multilevel lists from which to evaluate selection of a target, the selection of the target takes relatively little time and is not a function of the number of targets identified in the SS and NSS multilevel lists.

As noted above, the targets 122 may comprise IP addresses such as may be registered with a domain name service (DNS). DNS resolves a domain into one or more IP addresses. A load balancer, such as load balancer 110, can be used to resolve an incoming domain into one of multiple IP addresses (represented as targets 122). The weighted round robin technique described above can be used to select an IP address as part of a DNS domain name-to-IP address selection process with some IP addresses being higher greater than others. Higher weighted IP addresses will be selected more frequently by DNS than lower weighted IP addresses. A user can add an IP address (as a new target 122) to the target group 120, assign a final weight value to the newly added IP address, and have the newly added IP address transition through the slow start process described above.

Figure 6:
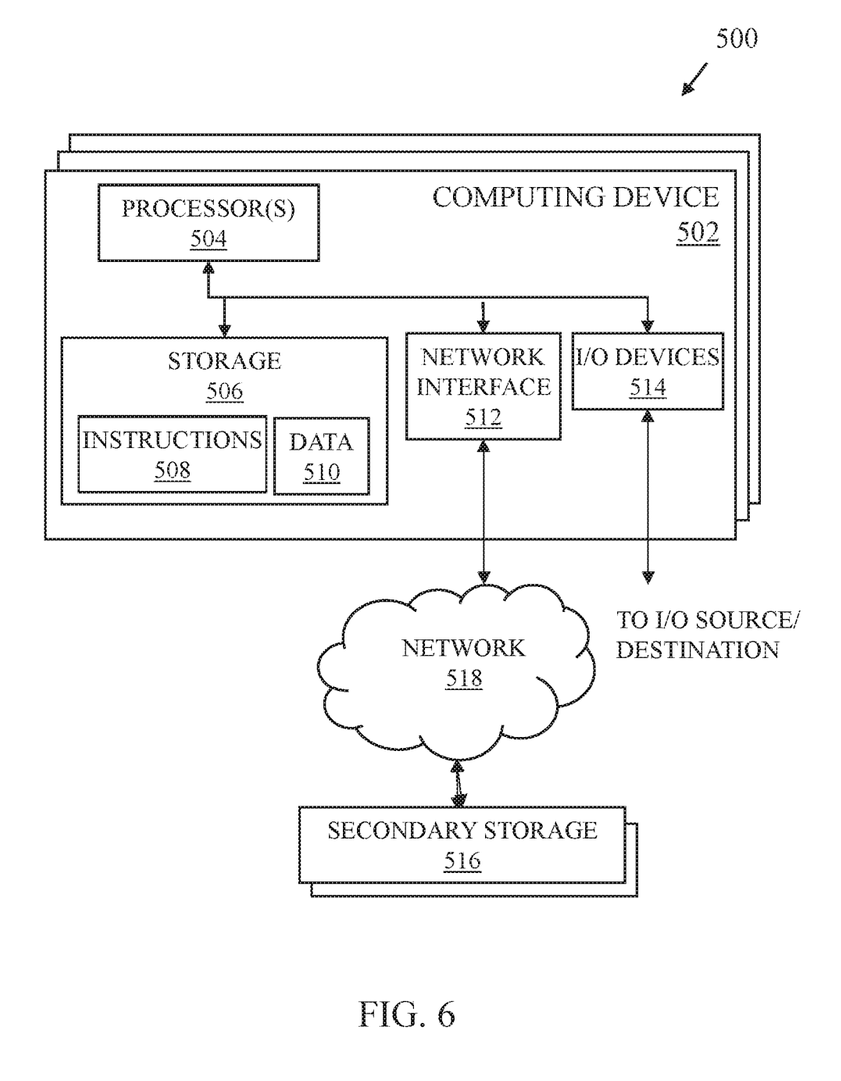
FIG. 6 shows an example of a hardware system for implementation of the load balancing service and other elements of the provider network in accordance with the disclosed embodiments.

FIG. 6 shows a schematic diagram for a computing system 500 suitable for implementation of any of the management interface 104, control plane 106, database 105, load balancer 110 (including the target group refresh code 112, the target selection code 114, and the NSS and SS multilevel lists 116 and 118), targets 122, or other components of the provider network 100 as described herein in accordance with various embodiments. The system includes one or more computing devices 502. The computing system 500 includes the computing devices 502 and secondary storage 516 communicatively coupled together via a network 518. One or more of the computing devices 502 and associated secondary storage 516 may be used to provide the functionality of the various components described herein.

Each computing device 502 includes one or more processors 504 coupled to a storage device 506, network interface 512, and I/O devices 514. In some embodiments, a computing device 502 may implement the functionality of more than one component of the system 100. In various embodiments, a computing device 502 may be a uniprocessor system including one processor 504, or a multiprocessor system including several processors 504 (e.g., two, four, eight, or another suitable number). Processors 504 may be any suitable processor capable of executing instructions. For example, in various embodiments, processors 504 may be general-purpose or embedded microprocessors implementing any of a variety of instruction set architectures ("ISAs"), such as the x86, PowerPC, SPARC, or MIPS ISAs, or any other suitable ISA. In multiprocessor systems, each of processors 504 may, but not necessarily, commonly implement the same ISA. Similarly, in a distributed computing system such as one that collectively implements the provider network 100, each of the computing devices 502 may implement the same ISA, or individual computing nodes and/or replica groups of nodes may implement different ISAs.

The storage device 506 may include a non-transitory, computer-readable storage device configured to store program instructions 508 and/or data 510 accessible by processor(s) 504. The storage device 506 also may be used to store the machine images as explained above. The storage device 506 may be implemented using any suitable volatile memory (e.g., random access memory), non-volatile storage (magnetic storage such as a hard disk drive, optical storage, solid storage, etc.). Program instructions 508 and data 510 implementing the functionality disclosed herein are stored within storage device 506. For example, instructions 508 may include instructions that when executed by processor(s) 504 implement the various services and/or other components of the service provider's network disclosed herein.

Secondary storage 516 may include additional volatile or non-volatile storage and storage devices for storing information such as program instructions and/or data as described herein for implementing the various aspects of the service provider's network described herein. The secondary storage 516 may include various types of computer-readable media accessible by the computing devices 502 via the network 518. A computer-readable medium may include storage media or memory media such as semiconductor storage, magnetic or optical media, e.g., disk or CD/DVD-ROM, or other storage technologies. Program instructions and data stored on the secondary storage 516 may be transmitted to a computing device 502 for execution by a processor 504 by transmission media or signals via the network 518, which may be a wired or wireless network or a combination thereof. Each of the components described herein may be implemented as a separate computing device 502 executing software to provide the computing node with the functionality described herein. In some embodiments, some or all of the various services may be implemented by the same computing device.

The network interface 512 may be configured to allow data to be exchanged between computing devices 502 and/or other devices coupled to the network 518 (such as other computer systems, communication devices, input/output devices, or external storage devices). The network interface 512 may support communication via wired or wireless data networks, such as any suitable type of Ethernet network, for example; via telecommunications/telephony networks such as analog, voice networks or digital fiber communications networks; via storage area networks such as Fibre Channel SANs, or via any other suitable type of network and/or protocol.

Input/output devices 514 may include one or more display terminals, keyboards, keypads, touchpads, mice, scanning devices, voice or optical recognition devices, or any other devices suitable for entering or retrieving data by one or more computing devices 502. Multiple input/output devices 514 may be present in a computing device 502 or may be distributed on various computing devices 502 of the system 500. In some embodiments, similar input/output devices may be separate from computing device 502 and may interact with one or more computing devices 502 of the system 500 through a wired or wireless connection, such as over network interface 512.

References to "based on" should be interpreted as "based at least on." For example, if a determination of a value or condition is "based on" a value of Y, then the determination is based at least on the value of Y; the determination may be based on other values as well.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A system, comprising:
a load balancer, including a memory coupled to a processor; and
storage including a non-slow start (NSS) multilevel list and a slow start (SS) multilevel list, wherein each of the multilevel lists includes a plurality of different weight levels, wherein at least one of the weight levels of the NSS multilevel list includes an identifier of a target virtual machine instance, and wherein at least one of the weight levels of the SS multilevel list includes a map that associates a target virtual machine identifier with a final weight value;
wherein the load balancer, responsive to receipt of a request, is configured to:
modify the SS multilevel list to move the at least one map from one weight level in the SS list to a higher weight level in the SS multilevel list based on a ramp time value;
responsive to a target virtual machine instance identifier included at a given weight level in the NSS multilevel list corresponding to a pointer, select the target virtual machine instance identified in the NSS multilevel list at the given weight level;
responsive to no target virtual machine instance identifiers included at the given weight level in the NSS multilevel list, select a target virtual machine instance identified in the SS multilevel list at the given weight level; and
forward the request to the selected target virtual machine instance;
wherein, responsive to a change in the ramp time value from a first ramp time to a second ramp time, the load balancer is configured to modify the SS multilevel list to recalculate weight levels for all maps in the SS multilevel list based on the second ramp time.

2. The system of claim 1, wherein the load balancer is configured to calculate a higher weight level for the map based on a current weight level for the map, a current time value, a registration time value for the target virtual machine corresponding to the target virtual machine identifier associated with the map, the final weight value, and the ramp time value.

3. The system of claim 1, wherein at least one of the weight levels of the SS multilevel list includes a first map that associates a first target virtual machine identifier with a first final weight value and a second map that associates a first target virtual machine identifier with a first final weight value, wherein the first final weight value is different than the second final weight value.

4. The system of claim 1, wherein the load balancer is configured to:
for a particular target virtual machine instance identifier in a map at a particular weight level in the SS multilevel list, add the particular target virtual machine instance identifier into the NSS multilevel list responsive to the weight in the SS multilevel list for the particular virtual machine instance identifier equaling the final weight value associate with the particular target virtual machine identifier; and
remove the map comprising the particular target virtual machine instance identifier from the SS multilevel list.

5. The system of claim 1, further comprising a management interface, including a memory coupled to a processor, wherein the management interface is configured to:
receive user input identifying target virtual machine instances to be included in a target group to which the load balancer forwards requests; and
receive user input identifying the ramp time value for the target group.

6. The system of claim 1, further comprising a management interface, including a memory coupled to a processor, wherein the management interface is configured to:
receive user input identifying target virtual machine instances to be included in a target group to which the load balancer forwards requests; and
receive user input identifying a final weight value for each target of the target group.

7. The system of claim 1, further comprising:
management interface, including a memory coupled to a processor, wherein the management interface is configured to receive user input identifying a change in the ramp time value from the first ramp time value to the second ramp time value.

* * * * *